United States Patent [19]
Kuroyanagi et al.

[11] Patent Number: 4,747,614
[45] Date of Patent: May 31, 1988

[54] HYDRAULIC CYLINDER MECHANISM

[75] Inventors: Masatoshi Kuroyanagi, Kariya; Kazuma Matsui, Toyohashi; Youzou Majima; Fumiaki Murakami, both of Kariya, all of Japan

[73] Assignee: Nippondenso Co., Ltd., Kariya, Japan

[21] Appl. No.: 25,275

[22] Filed: Mar. 12, 1987

[30] Foreign Application Priority Data

Mar. 12, 1986 [JP] Japan .................. 61-53915

[51] Int. Cl.⁴ .............. B62D 17/00; B60G 25/00; B60G 17/00
[52] U.S. Cl. ................. 280/661; 280/688; 280/701; 280/702
[58] Field of Search ............ 280/661, 701, 91, 702

[56] References Cited

U.S. PATENT DOCUMENTS

| | | | |
|---|---|---|---|
| 3,498,630 | 3/1970 | Crawford | 280/661 |
| 4,601,357 | 7/1986 | Miyoshi et al. | 280/91 |
| 4,669,567 | 6/1987 | Nakamura et al. | 280/91 |

FOREIGN PATENT DOCUMENTS

| | | | |
|---|---|---|---|
| 166566 | 8/1985 | Japan | 280/91 |
| 146708 | 8/1985 | Japan | 280/661 |
| 60-138815 | 9/1985 | Japan | . |

Primary Examiner—Richard A. Bertsch
Attorney, Agent, or Firm—Cushman, Darby & Cushman

[57] ABSTRACT

The hydraulic cylinder mechanism has a main piston which has a piston portion, two sub-pistons which is so located that the sub-pistons can hold the piston portion, control pressure chambers which are formed between the sub-piston and the piston portion, and holding pressure chambers which are formed at behind of the sub-piston. The hydraulic cylinder mechanism controls automotive rear wheel alignment when the main piston moves axially according to the pressure in the control pressure chambers and can maintain its neutral position when the pressure in the holding chamber is applied to the sub-piston so that holds the piston portion.

5 Claims, 9 Drawing Sheets

HYDRAULIC CYLINDER MECHANISM

BACKGROUND OF THE INVENTION

1. Field of the Invention

The present invention relates to a hydraulic cylinder mechanism and, more particularly, to a hydraulic cylinder mechanism for controlling a automotive wheel alignment.

2. Description of the Prior Art

One wheel alignment control mechanism of the prior art is disclosed in Japanese Utility Model Laid-Open publication (Kokai) No. 138815/1985, for example.

In the structure of the prior art, however, it is seriously difficult to control two rear wheels generally in parallel to the center of a control range while the automobile is running straight with no change in the direction of the rear wheels. In the prior art structure, more specifically, the direction of the rear wheels can be changed, but the structure is not made to hold a changed position, i.e., a fixed position.

As a result, in case the rear wheels are to be held in the straight direction while the automobile is abruptly accelerating or decelerating, a high load (up to several hundred kilograms) is exerted as a reaction of the tires upon a hydraulic cylinder mechanism for orienting the rear wheels. This raises a trouble that the hydraulic cylinder mechanism is unable to hold the straightness of the tires by that high load. This trouble is accompanied by a problem that the rear wheels will exhibit the behavior of toe-in when in an abrupt acceleration and the behavior of toe-out when in an abrupt deceleration.

SUMMARY OF THE INVENTION

The present invention has been conceived with a view to solving the above-specified problem and has an object to make it possible to control the swinging motions of a wheel satisfactorily and to hold the wheel accurately and reliably in a fixed position.

In order to achieve this subject matter, according to the present invention, swing means is used for swinging a wheel and is driven by a hydraulic cylinder mechanism. This hydraulic cylinder mechanism is equipped with a main piston having a piston body and two sub-pistons clamping the piston body from the two sides. These two sub-pistons and the main piston form together a holding pressure chamber which is always under a high pressure. This high pressure causes the main piston to be held reliably in an intermediate position between the two sub-pistons. The two sub-pistons further form control pressure chambers at their respective outsides. These control pressure chambers have a larger pressure receiving area than that of the holding pressure chamber. As a result, when that high pressure is introduced into the control pressure chambers, the main piston can be driven by that high pressure against the pressures in the holding pressure chambers.

With the aforementioned construction and operations thus achieved, the suspension structure of the present invention can always hold the wheel in the constant fixed position while the automobile is normally running. At the same time, accurate swinging motions can be imparted, if necessary, to the wheel through the main piston.

DESCRIPTION OF THE PREFERRED EMBODIMENTS

The present invention will be described in the following in connection with one embodiment thereof with reference to the accompanying drawings.

Figure 1:
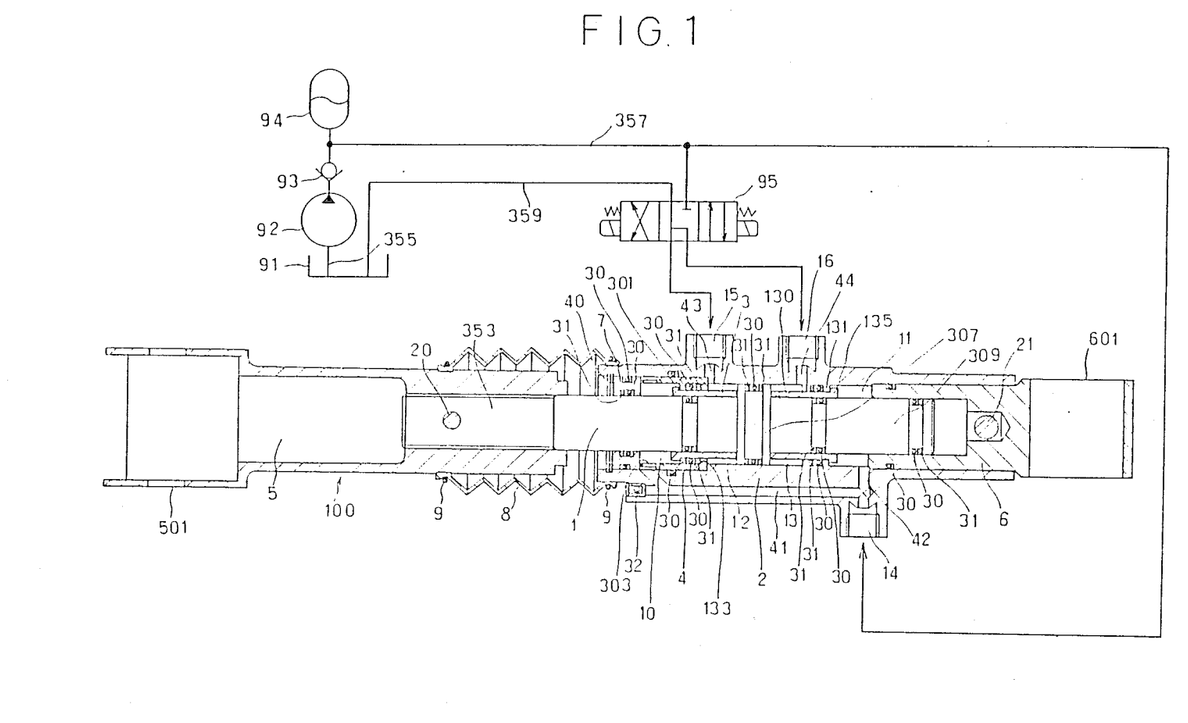
FIG. 1 is a sectional view showing a hydraulic piston to be used in a wheel suspension structure of the present invention.

A main piston 1 is fitted slidably in a cylinder 2. The main piston 1 is formed at its center integrally with a piston portion 307. This piston portion 307 has substantially the same external diameter as the internal diameter of the cylinder 2.

The piston portion 307 is arranged at its two sides with a first sub-piston 3 and a second sub-piston 130. These first and second sub-pistons 3 and 130 have cylindrical shapes which are formed with retaining flanges 301 and 135 at their respective ends. A stopper 4 is fixed on the inner wall of the cylinder 2. This cylinder 2 is further formed with a retaining portion 131 which is positioned to face the stopper 4 across the piston portion 307.

A shorter arm 6 is jointed oil-tight to one end of the cylinder 2 through an O-ring 30. The shorter arm 6 is connected integrally to the cylinder 2 by means of a pin 21. Incidentally, the leading end of the main piston 1, i.e, a shaft portion 309 is inserted slidably into the shorter arm 6. Another O-ring 30 is interposed between the shaft portion 309 and the shorter arm 6 to keep oil-tightness between them. This O-ring is backed up by a backup ring 31.

The aforementioned stopper 4 and retaining portion 131 are engaged by the respective retaining flanges 301 and 135 of the first and second sub-pistons 3 and 130. Oil-tightness is kept between the stopper 4 and the first sub-piston 3 by a further O-ring 30. Incidentally, the first sub-piston 3 is made slidable on the outer circumference of the main piston 1 and the inner face of the stopper 4.

Likewise, the second sub-piston 130 is also held slidably on the outer circumference of the main piston 1 and made slidable on the inner face of the retaining portion 131.

The cylinder 2 is arranged at its left end with a seal ring 7. This seal ring 7 is kept oil-tight with the cylinder 2 and the main piston 1 through a further O-ring 30. Moreover, the seal ring 7 is fixed by another snap ring 40.

Between a longer arm 5 and the cylinder 2, there is interposed a dust cover 8 which acts to prevent any foreign substance such as dust from stealing into the sliding portion of the main piston 1. Reference numeral 9 denotes a clip for fixing the two ends of the dust cover 8 to the longer arm 5 and the cylinder 2.

The main piston 1 has its leading end portion threaded, as at 353, to fix the longer arm 5. Moreover, a pin 20 fixes the longer arm 5 and the cylinder 2 to effect no relative rotation. A holding pressure port 14 is formed in the cylinder 2 to have communication with a first holding oil passage 41 and a second holding oil passage 42. These first and second holding oil passages 41 and 42 are formed in the cylinder 2.

A second holding pressure chamber 11 is formed between the opposed two faces of the retaining flange 135 and the shorter arm 6 and between the outer face of the shaft portion 309 and the inner face of the cylinder 2. The second holding pressure chamber 11 has communication with the second holding oil passage 42.

A first holding pressure chamber 10 is also formed between the opposed two faces of the retaining flange 301 and the seal ring 7 and between the outer face of the main piston 1 and the inner face of the cylinder 2. The first holding pressure chamber 10 has communication with the first holding oil passage 41.

A first control pressure chamber 12 and a second control pressure chamber 13 are formed within the cylinder 2 at both sides of the piston portion 307. The first control pressure chamber 12 is defined by the side face of the piston portion 307, the side face of the stopper 4, the outer face of the first sub-piston 3 and the inner face of the cylinder 2. Likewise, the second control pressure chamber 13 is defined by the side face of the piston portion 307, the side face of the retaining portion 131, the outer face of the second sub-piston 130 and the inner face of the cylinder 2.

Control pressure ports 15 and 16 are formed within the cylinder 2 so that the control ports 15 and 16 open to the first and second control pressure chamber 12 and 13. The control pressure port 15 has communication with the first control pressure chamber 12 via a first control oil passage 43. On the other hand, the control pressure port 16 has communication with the second control pressure chamber 13 via a second control oil passage 44.

A pump 92 is driven by a prime mover such as an automotive engine or an electric motor. A reservoir tank 91 has its oil sucked into the pump 92 via a pressure passage 355. The oil under a high pressure pumped out from the pump 92 is discharged to a high-pressure passage 357 through a check valve 93. Incidentally, the high-pressure passage 357 is connected to an accumulator 94 so that the pressure of the oil in the passage 357 is always held at a substantially constant level. The high-pressure oil is led out via the high-pressure passage 357 to an electromagnetic switching valve 95 and the holding pressure port 14.

The electromagnetic switching valve 95 switches and discharges the high-pressure oil from the high-pressure passage 357 to the control pressure port 15 or 16. At the same time, the electromagnetic switching valve 95 has communication with the reservoir tank 91 via a low-pressure passage 359. By the action of this electromagnetic switching valve 95, the pressure of the oil to be introduced into the control port 16 is switched to a high or low pressure, and the pressure of the oil to be supplied to the control pressure port 15 is switched to a high or low pressure.

Figure 2:
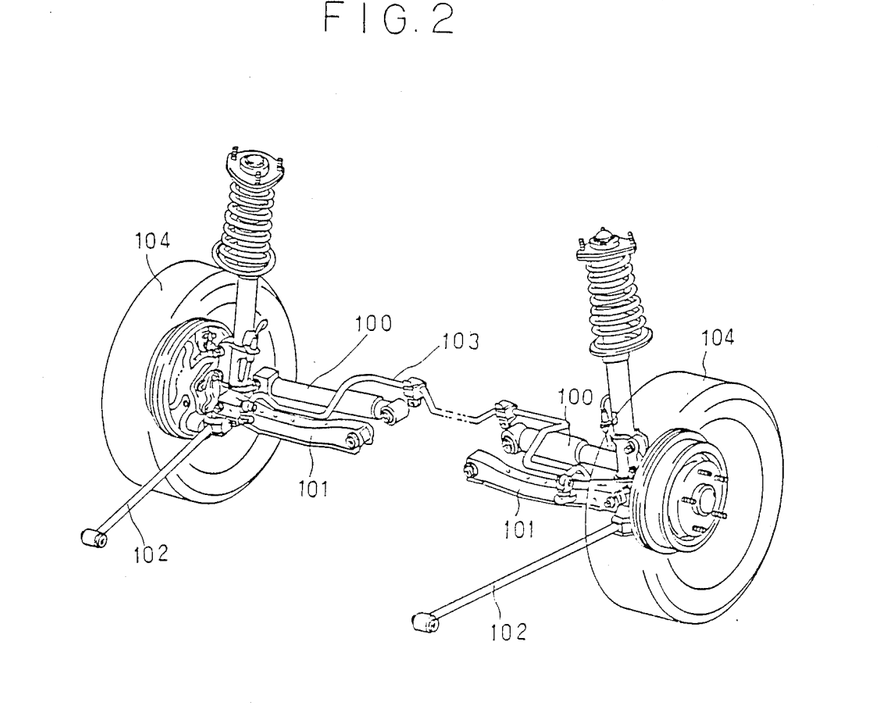
FIG. 2 is a perspective view showing the assembled state of the hydraulic piston shown in FIG. 1.

FIG. 2 shows the state in which a second arm 100 shown in FIG. 1 is actually connected to a wheel 104. As shown, the longer arm 5 has its arm joint portion 501 connected to the side of the wheel 104, whereas the shorter arm 6 has its arm joint portion 601 connected to the automotive body frame. Here, the wheel 104 is also held on the automotive body by a first arm 101. In other words, the wheel 104 is connected to the body by the two arms, i.e., the first arm 101 and the second arm 100.

As a result, the direction of the wheel 104 is controlled if the whole length of the second arm 100 is elongated. At the same time, the wheel 104 is held on the car body, too, by means of a strut rod 102. Next, the operations of the mechanism having the afore-mentioned construction will be described in the following. As shown in FIG. 1, the pressure to be applied to the control pressure ports 15 and 16 is switched between the high and low levels by the electromagnetic switching valve 95. The low pressure is the pressure in the reservoir tank 91 normally at an atmospheric level.

The electromagnetic switching valve 95 is an electromagnetic valve for conducting its switching actions in response to an electric signal. If the voltage to be applied to the electromagnetic switching valve 95 is 0, for example, the control pressure ports 15 and 16 have communications with the reservoir tank 91, as shown in FIG. 1. In the state where the voltage to be applied to the electromagnetic switching valve 95 is positive, the control pressure port 15 communicates with the reservoir tank 91 whereas the control pressure port 16 communicates with the accumulator 94. If the voltage to be applied to the electromagnetic change-over valve 95 is negative, on the contrary, the control pressure port 15 communicates with the accumulator 94 whereas the control pressure port 16 communicates with the reservoir tank 91.

Figures 3, 4:
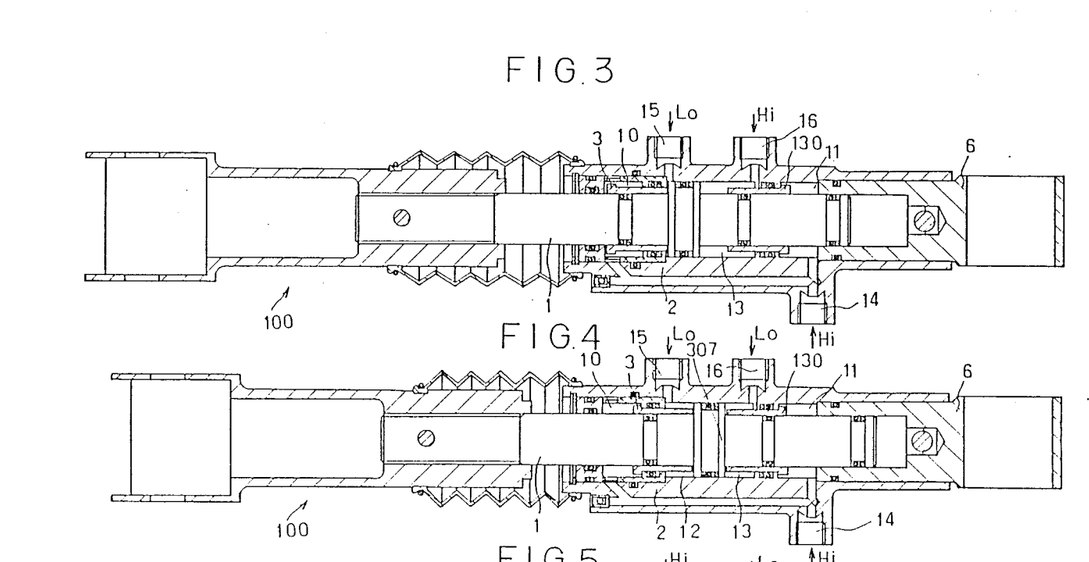
FIGS. 3, 4 and 5 are sectional views showing the individual switched states of the hydraulic piston shown in FIG. 1.
Figure 5:
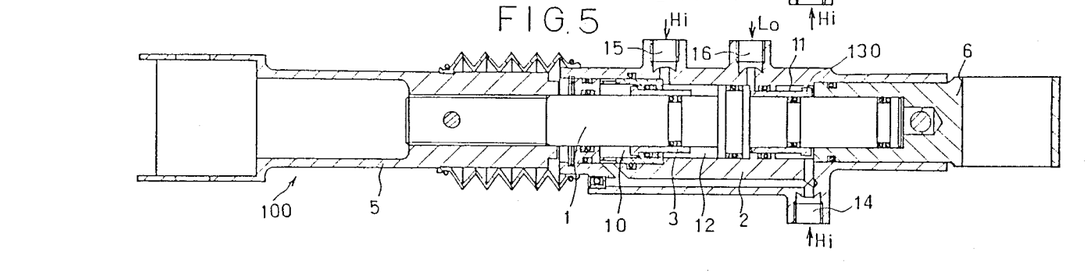

FIGS. 3, 4 and 5 show the individual states after the communications are switched by the electromagnetic switching valve 95. FIG. 3 shows the state in which a positive voltage is applied to the electromagnetic switching valve 95. More specifically, the control pressure port 16 is supplied with the high pressure from the pump 92 whereas the control pressure port 15 is at the atmospheric pressure. As a result, the high pressure is supplied to the second control pressure chamber 13 communicating with the control pressure port 16. The following relation holds among the second control pressure chamber 13, the second holding pressure chamber 11 and the first holding pressure chamber 10.

Specifically, the pressure receiving areas of the first and second control pressure chambers 12 and 13 defined by the external outer circumference of the piston portion 307 and the inner circumferences of the second sub-piston 130 and the cylinder 2 are made larger than that defined by the side face of the retaining flange 135.

As a result, the control force given from the pressures in the first and second control pressure chambers 12 and 13 to the main piston 1 is larger than those given from the pressures in the second and first holding pressure chambers 11 and 10 to the second sub-piston 130 and the first sub-piston 3. For example, in the state shown in FIG. 3, the same high oil pressure is applied to the insides of the second control pressure chamber 13 and the first holding pressure chamber 10. However, the pressure in the second control pressure chamber 13 exerts higher influences upon the piston portion 307. In other words, the pressure in the second control pressure chamber 13 is applied to the whole side face of the piston portion 307. On the contrary, the pressure in the first holding pressure chamber 10 is transmitted through the side of the first sub-piston 3 to the piston portion 307. As is apparent from FIG. 3, the pressure receiving area of the first sub-piston 3 is made smaller than that of the piston portion 307. As a result, the piston portion 307 is displaced by a predetermined difference in the biasing force even if the second control pressure chamber 13 and the first holding pressure chamber 10 have the same pressure. Incidentally, the second sub-piston 130 is not displaced.

The main piston 1 positions as shown in FIG. 4 when no encouraging signal is leaded to the electromagnetic switching valve 95. In this state, as shown in FIG. 1, the pressure in the reservoir tank 91 is introduced into the first and second control pressure chambers 12 and 13. As a result, the pressures in the first and second control pressure chambers 12 and 13 become atmospheric and are lower than the high pressure in the first and second holding pressure chambers 10 and 11. This high pressure in the first and second holding pressure chambers 10 and 11 is applied to the first and second sub-pistons 3 and 130 so that these pistons 3 and 130 are forced to the piston portion 307. At this time, the second and first sub-pistons 130 and 3 have their displacements regulated by the retaining flanges 135 and 301. FIG. 4 shows the state in which the first and second sub-pistons 3 130 have moved to the farthest positions. In this state, the first sub-pistons 3 and 130 abut against the two side faces of the piston portion 307. As a result, in the state shown in FIG. 4, the piston portion 307 is held in a predetermined intermediate position.

In this state, the two wheels 104 are in parallel to each other. As a result, if the automobile abrupt starts or decelerates, the load from it is applied trough the wheel 104 to the second arm 100. In the present embodiment, however, the piston portion 307 is held in the predetermined position by the high pressure in the first and second holding pressure chambers 10 and 11, as has been described hereinbefore. As a result, the whole length of the second arm 100 is unvaried even if the high load is supplied through the wheel 104 to the second arm 100.

The main piston 1 positions as shown in FIG. 5 when the negative voltage is applied to the electromagentic switching valve 95. A high pressure oil is supplied into the first control pressure chamber 12 throug the control pressure port 15. The oil in the second control pressure chamber 13 returns to the reservoir 91 through the control pressure port 16. This high pressure in the first control pressure chamber 12 displaces the piston portion 307 rightwardly of the drawing.

Thus, the whole length of the second arm 100 can be increased or decreased by the switching action of the electromagnetic switching valve 95. If the second arm 100 is extended, as apparent from FIG. 2, the so-called "toe-in" state is invited, in which the two rear wheels converge forward and diverge backward. If the second arm 100 is contracted, on the contrary, the wheels diverge forward and converge backward to invite the toe-out state.

In the state where one second arm 100 is extended but the other second arm 100 is contracted, the wheels 104 can be steered slightly. An understeer state can be taken by steering the rear wheels in a direction of the same phase as that of the front wheels while the automobile is to be turned at a high speed. In this understeer state, a stable high-speed turning performance can be attained. If the rear wheels are steered in the direction of phase opposed to that of the front wheels while the automobile is to be turned at a low speed, on the contrary, an oversteer state can be taken to improve the turning performance and to realize a quick and sharp steering feeling.

Figure 6:
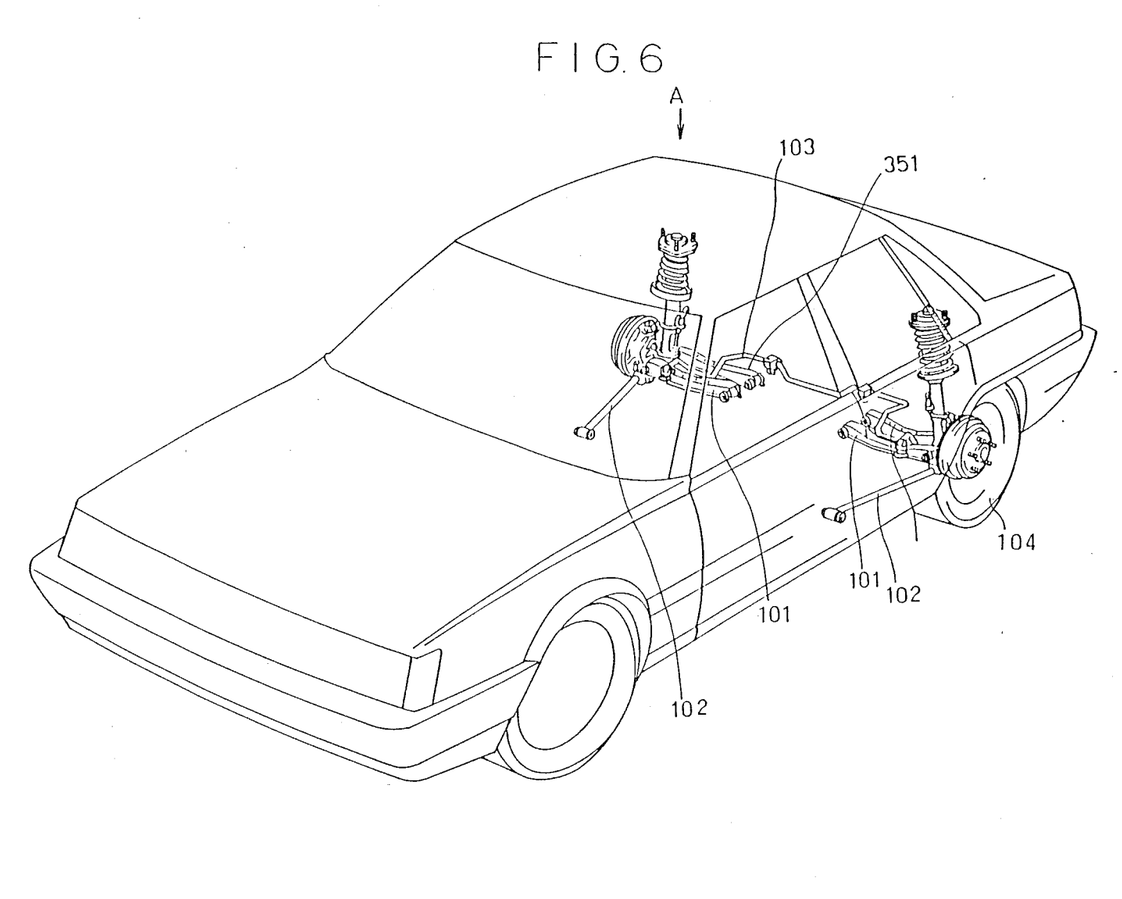
FIG. 6 shows the automotive wheel suspension structure of the prior art and is used for explaining the mounted position of the hydraulic piston.

Incidentally, FIG. 6 shows an automotive wheel suspension structure of the prior art, in which the first arm 101 and a second arm 351 are arranged in parallel. It will be understood from FIG. 6 that the understeer state and the oversteer state can be given to the rear wheels of the automobile if the second arm 351, i.e, the second arm 100 in the present invention is displaced.

In the foregoing embodiment, the second arm 100 can have its whole length controlled, but the whole length of the first arm 101 in place of the second arm 100 may be controlled. Moreover, both the whole lengths of the second and first arms 100 and 101 may be made controllable.

Figure 7:
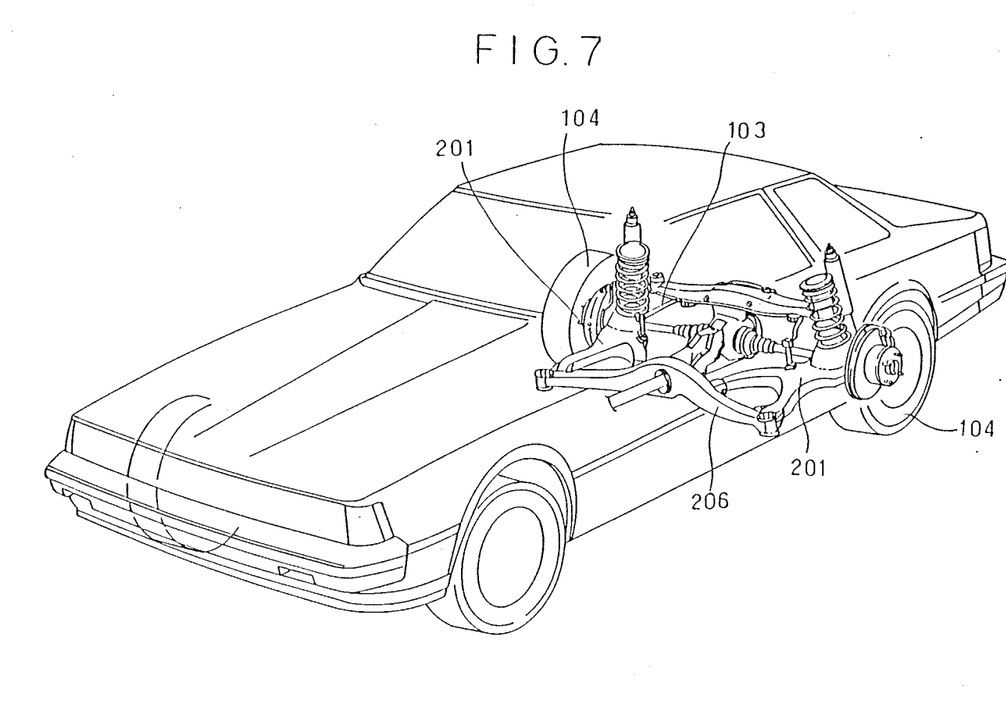
FIGS. 7 and 11 also show the wheel suspension structure of the prior art but is used for explaining the mounted position of the structure according to a second embodiment of the present invention.
Figure 11:
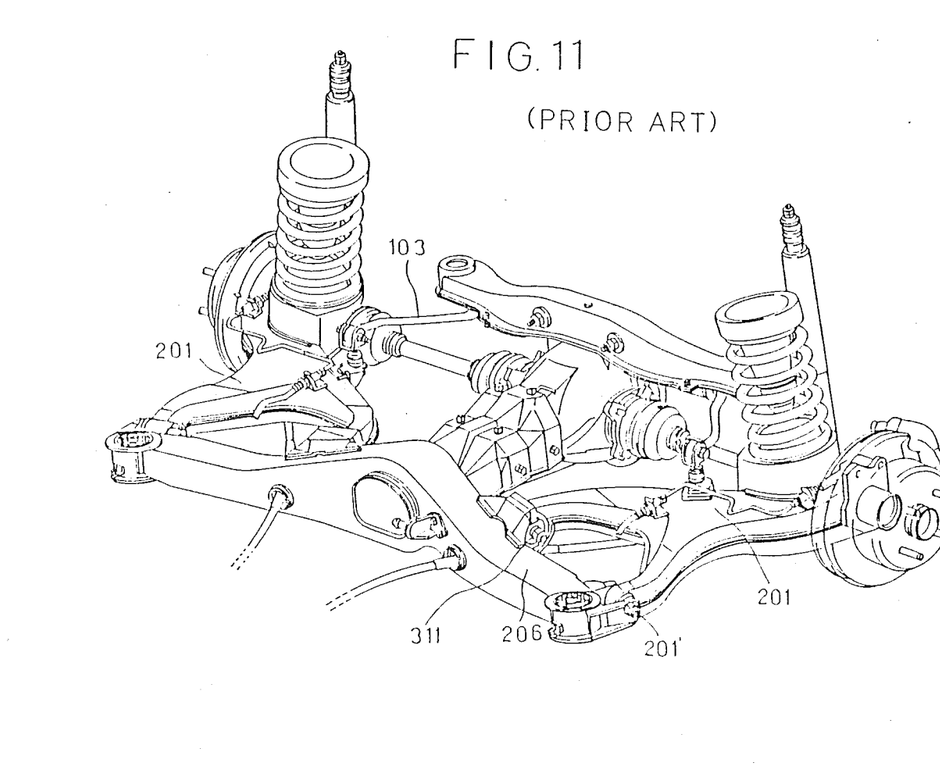

Incidentally, the present invention can naturally be applied to wheel suspension structures other than the aforementioned one, too. For example, FIG. 7 and FIG. 11 show a semi-trailing arm type suspension mechanism, to which the present invention can be applied.

Figure 8:
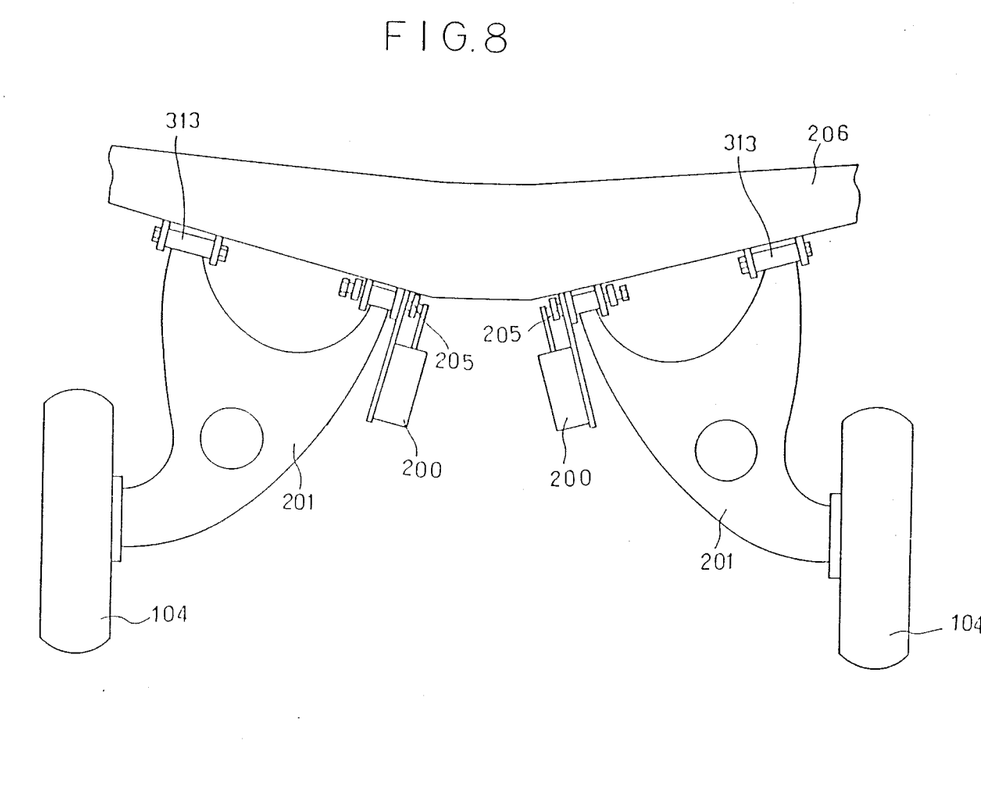
FIG. 8 is a top plan view showing a suspension structure according to the second embodiment of the present invention.

Another embodiment to be used in the suspension shown in FIG. 7 will be described in the following. FIG. 8 shows this semi-trailing arm type suspension schematically, and the wheel is suspended by the trailing arm 201. The trailing arm 201 is suspended by the frame 206 at two positions, i.e., the connecting portion 313 and an eccentric bolt 205. The frame 206 itself is fixed to the automotive body. In the present embodiment, the trailing arm 201 is swung clockwise or counter-clockwise of the drawing by turning the eccentric bolt 205 by making use of the eccentricity of the bolt 205. The turns of the eccentric bolt 205 is performed by an actuator 200.

Figure 9:
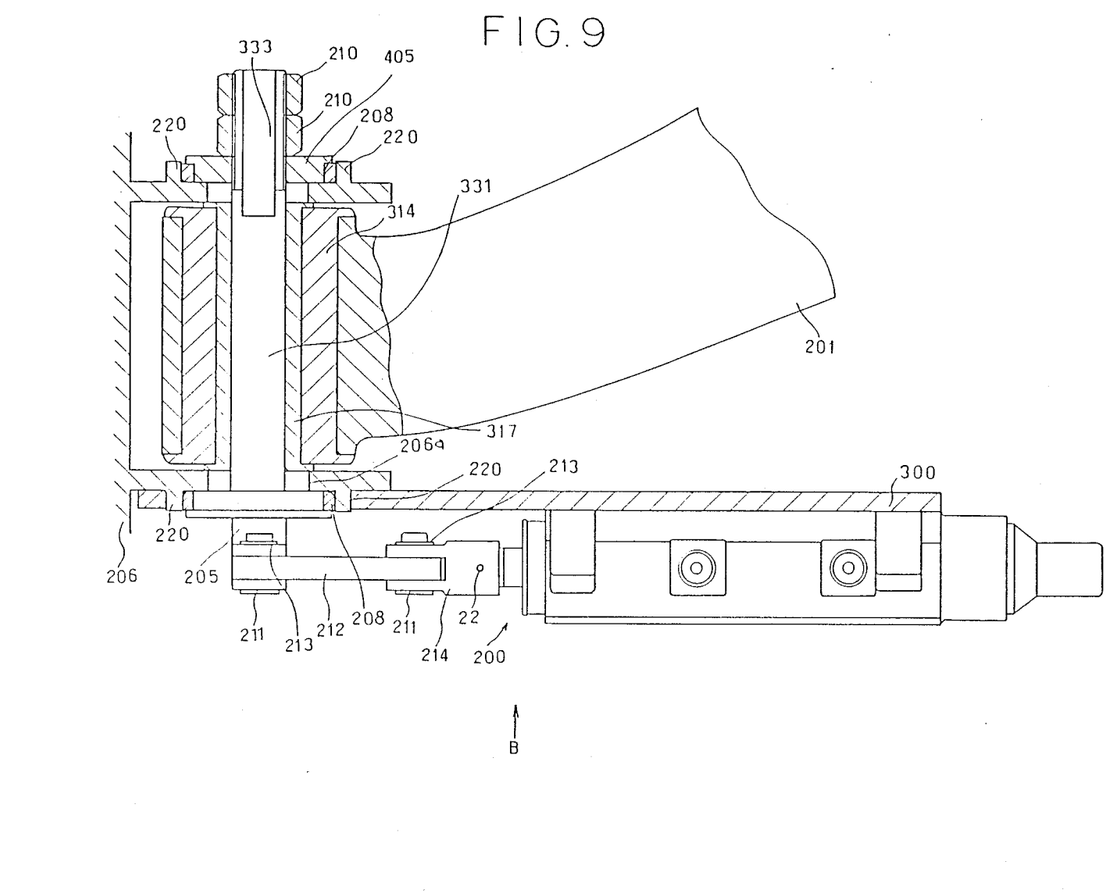
FIG. 9 is a sectional view showing the hydraulic cylinder mechanism and its mounting portion shown in FIG. 8.

As shown in FIG. 9, the eccentric bolt 205 has its stem 331 formed to have a predetermined eccentricity with respect to a journal ring 208. The bolt stem 331 has a chamferred portion 333 at its end portion. Moreover, an eccentric plate 405 is fixed to the end portion of the bolt stem 331 by means of nuts 210. The eccentric plate 405 is held at its two ends on guide portions 220 through the journal ring 208. As better seen from FIG. 10, the eccentric bolt 205 is prevented from fluctuating clockwise and counter-clockwise of the drawing by the guide portions 220. Since the eccentric bolt 205 and the bolt stem 331 are eccentric from each other, as has been described above, the bolt stem 331 is displaced to the right or left of FIG. 10 if the eccentric bolt 205 is turned by the actuator 200.

This displacement of the bolt stem 331 causes fluctuations of the gap between a frame 206 and the trailing arm 201, as shown in FIG. 8.

In other words, the swinging motions of the trailing arm 201 are controlled if the bolt stem 331 is turned by the actuator 200.

As shown in FIG. 9, the actuator 200 is connected through a pin 22 to a connecting member 214. In turn, this connecting member 214 is connected to a bar 212 through a shaft 211.

As a result, if the actuator 200 is extended by the oil pressure controlled by the electromagnetic switching valve 95, this displacement is transmitted to the bar 212. If the bar 212 fluctuates to the right or left of FIG. 10, these fluctuations rotate the eccentric bolt 205. These turns of the eccentric bolt 205 are converted into the displacements of the bolt stem 331, as has been described above.

Incidentally, as shown in FIG. 9, the eccentric bolt 205 and the bar 212 are connected by the shaft 211 and the snap ring 213. On the other hand, the guide portions 220 are made integral with the frame 206. And, this frame 206 is fixed to the automotive body, as has been described hereinbefore.

In this embodiment, the actuator 200 operates similar to those of the second arm 100. Specifically, the displacement of the actuator 200 is controlled by switching the oil pressures to be introduced into the control pressure ports 15 and 16. In case the piston portion 307 is to be held in the fixed position, the second holding pressure chamber 11 and the piston portion 307 are held reliably in the fixed positions by the pressures in the first and second holding pressure chambers.

Figure 10:
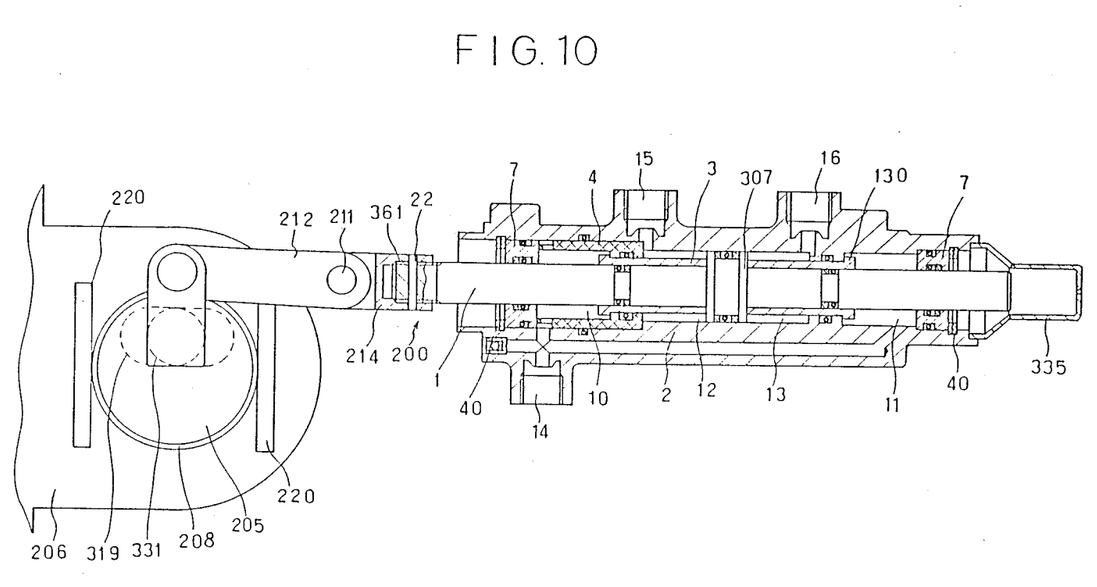
FIG. 10 is a sectional view taken in the direction of arrow B of FIG. 9.

In the embodiment of FIG. 10, the main piston 1 is formed at its end portion with a threaded portion 361 which is in meshing engagement with the threaded portion formed in the inner face of a connecting member 214. And, the main piston 1 is held in position by the pin 22, as has been described hereinbefore. In FIG. 10, moreover, the dust cover 335 is arranged at the end of the cylinder 2 to prevent any dust from stealing to the main piston 1. On the other hand, the seal ring 7 is held in position by the snap ring 40. In the present embodiment, moreover, the cylinder 2 need not be connected to the shorter arm 6, as different from the foregoing embodiments.

In the mechanism according to this embodiment, as shown in FIG. 8, the wheels 104 take the toe-out state if the trailing arm 201 moves inward about its connected portion 313. If, on the other hand, the main piston 1 moves rightward of FIG. 10, the eccentric bolt 205 turns clockwise of FIG. 10 so that the bolt stem 331 moves rightward. This rightward movement of the bolt stem 331 causes the trailing arm 201 outward of FIG. 8. In other words, that movement displaces and diverges the trailing arms 201 outward around the connecting portions 313. As a result, the wheels 104 take the toe-in state.

The wheels 104 can be steered if the operating states of the right and left actuators 200 are reversed. As a result, the wheels 104 can be brought into the oversteer and understeer states. Incidentally, the oil pressure pipings of the actuators are made similar to those of the foregoing embodiment shown in FIG. 1.

It should be especially appreciated that the toe-in regulating mechanism of the embodiment shown in FIG. 8 does not increase the arm weight. This achieves an effect that the characteristics of the suspension can be made equivalent to those of the prior art. Since, moreover, the movement of the bolt stem 331 makes use of the principle of lever, the force from the wheel 104 is not applied directly to the actuator 200. As a result, it is possible to reduce the diameter of the main piston 1.

What is claimed is:

1. A hydraulic cylinder mechanism for controlling the displacement of swing means which swingably supports an automotive wheel to an automotive body in order to control wheel alignment comprising:
   a cylinder member connected to one of said body and said wheel;
   a main piston arranged slidably in said cylinder member and connected to another one of said body and said wheel;
   a piston portion formed in said main piston and made movable together with said main piston;
   two cylindrical sub-pistons surrounding said main piston and clamping said piston portion from both sides of said piston portion in said cylinder member;
   control pressure chambers formed between said sub-pistons and said piston portion so that said piston portion is driven in accordance with the pressure in said control pressure chambers; and
   holding pressure chambers formed at back of said sub-pistons so that said piston portion is held in a predetermined position by the pressure in said holding pressure chambers.

2. A hydraulic cylinder mechanism according to claim 1, wherein said swing means includes an arm portion arranged between said wheel and said automotive body and displaces the whole length of said arm portion.

3. A hydraulic cylinder mechanism according to claim 1, wherein said swing means includes an arm portion arranged between said wheel and said automotive body and displaces a connected position of said arm portion and said body.

4. A hydraulic cylinder mechanism according to claim 1, further comprising an electromagnetic valve for switching and controlling the control oil pressures supplied to both the first control pressure chamber formed between one of said sub-piston and said piston portion and the second control pressure chamber formed between the other sub-piston and piston portion.

5. A hydraulic cylinder mechanism according to claim 1, wherein the receiving areas of said control pressure chambers to which the control pressure is applied in order to move said main piston are larger than those of the holding pressure chambers to which the control pressure is applied in order to move said sub-piston.

* * * * *